March 14, 1939.  W. O. MITSCHERLING  2,150,657
HYDROCARBON CONVERSION
Filed June 1, 1935
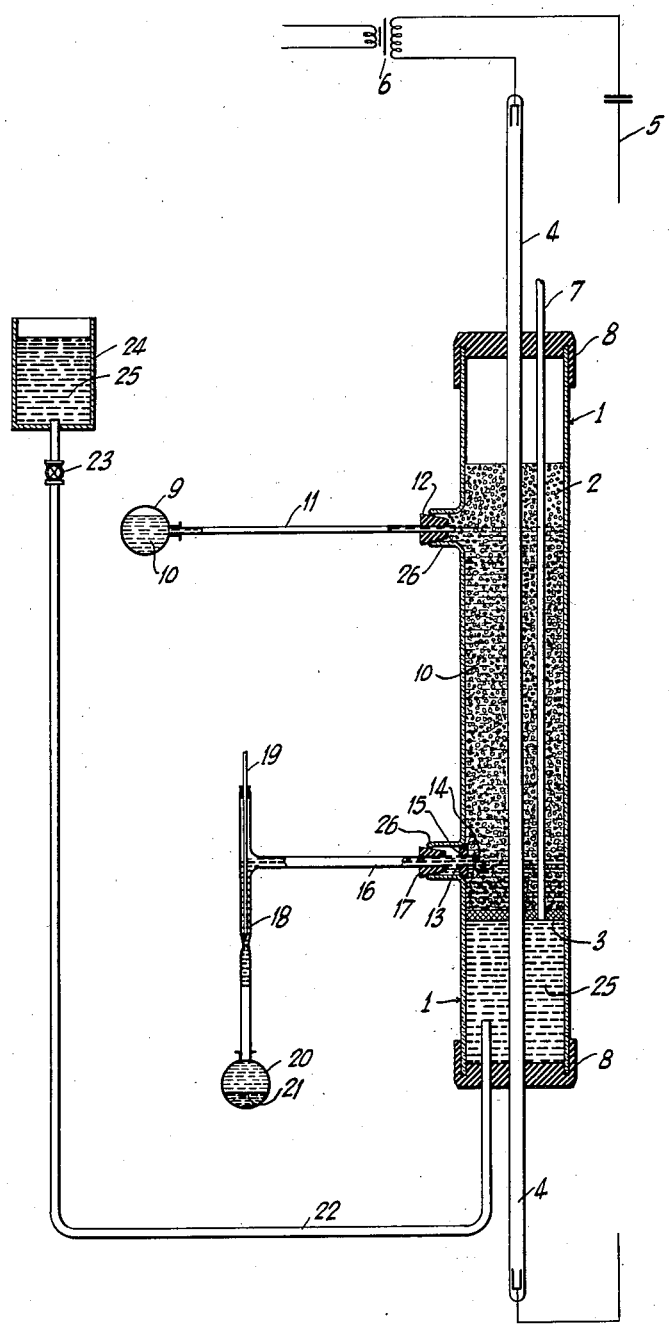
INVENTOR
WALDEMAR O. MITSCHERLING
BY
Watson, Bristol, Johnson & Leavenworth
ATTORNEYS Patented Mar. 14, 1939

2,150,657

UNITED STATES PATENT OFFICE 2,150,657

HYDROCARBON CONVERSION

Waldemar O. Mitscherling, Bridgeport, Conn., assignor to The Neon Research Corporation, Bridgeport, Conn., a corporation of Connecticut Application June 1, 1935, Serial No. 24,479

11 Claims. (Cl. 204—31)

The invention relates to the conversion of hydrocarbons. More particularly it relates to a procedure whereby hydrocarbons are converted into oxygenated compounds, to a catalytic agent in the presence of which reaction is effected, and to an apparatus therefor, and includes correlated improvements and discoveries whereby the conversion of hydrocarbons is enhanced.

An object of the invention is to provide a process whereby hydrocarbons may be converted under the influence of radiations or radiant energy from a rare gas lamp.

Another object of the invention is to provide a process in accordance with which hydrocarbons may be converted into oxygenated compounds under the influence of radiations from a rare gas lamp and in interfacial contact with a conductive liquid.

An additional object of the invention is to provide a process whereby hydrocarbons may be converted, for example, into alcohols, readily, effectively and economically in a commercial manner.

A still further object of the invention is to provide a process whereby hydrocarbons may be converted, for example, into alcohols under the influence of radiations from a neon lamp in the presence of a catalytic agent in interfacial contact with a conductive liquid.

It is also an object of the invention to provide a catalytic agent containing a plurality of metals and aluminum oxide and which serves effectively to bring about the conversion of a hydrocarbon into an alcohol.

Furthermore, it is an object of the invention to provide an apparatus in which a hydrocarbon may be converted by subjecting it to the influence of radiant energy in the presence of a catalytic agent and with interfacial contact with a conductive liquid.

Other objects of the invention will in part be obvious and will in part appear hereinafter.

The invention accordingly comprises the several steps and relation of one or more of such steps with respect to each of the others thereof, the catalyst possessing the characteristics, properties, and relation of components, and the apparatus having the features of construction, combination of elements and arrangement of parts, all of which will be exemplified hereinafter, and the scope of the invention will be indicated in the claims.

For a fuller understanding of the nature and objects of the invention reference should be had to the following detailed description taken in connection with the accompanying drawing, in which there is depicted an apparatus suitable for the conversion of hydrocarbons, more particularly into alcohols. This apparatus consists of a reaction chamber 1, preferably constructed as a cylinder of pyrex glass carrying the side tubulatures 26, constant pressure means for supplying conductive liquid and hydrocarbon to the reaction vessel, a porous septum 3 positioned below the lower tubulature, a rare gas lamp 4, as a neon lamp, positioned within said tube and surrounded by catalytic material 10, and means comprising elements 14, 15, 16, 18, 19 and 20 for withdrawing hydrocarbon and conductive liquid simultaneously from the reaction chamber.

In the practice of the invention a hydrocarbon may be converted as, for example, into alcohols, specifically ethyl, propyl and butyl alcohol, by subjecting the hydrocarbon to the influence of radiations from a rare gas lamp. The conversion is effected in the presence of a suitable catalytic agent and with the hydrocarbon in interfacial contact with a conductive material. The hydrocarbons may be those belonging to the aliphatic and to the aromatic series, and also the intermediate acyclic or naphthenic type of hydrocarbon. Preferably and for the preparation of ethyl, butyl, etc., alcohols, aliphatic hydrocarbons are utilized, and more especially those having a boiling point of less than about 400° F. When the hydrocarbon is conducted through the reaction chamber it contacts with the catalytic agent which suitably is one comprising a porous insoluble material impregnated with a plurality of metals while under the influence of radiations from a rare gas lamp, as a neon, argon, krypton positive column tube.

The catalytic agent may contain as impregnating materials a salt of a heavy metal and a salt of a rare earth metal which are subsequently reduced to the metallic state depositing metal within the pores of the material, together with aluminum oxide. Among the metals which may be used in the form of their salts for the impregnation, mention may be made of copper, platinum, chromium, iron, manganese, nickel, cobalt, cerium, thorium, vanadium, molybdenum and lanthanum. The aluminum oxide is utilized in conjunction with a plurality of metals in the catalyst in the form of a fine powder or of a size which may be 20 to 30 standard mesh. An interfacial contact is made between the hydrocarbon and a conductive liquid having a specific gravity greater than the hydrocarbon so that the hydrocarbon rests upon and flows away from the surface of the conductive liquid. This liquid desirably is an aqueous solution of an electrolyte, more especially of a sulfate and/or a phosphate, and particularly the phosphates and sulfates of magnesium, calcium, sodium, potassium, cadmium and zinc. While the concentration of this solution may vary from 0.1% to 2%, it has been found that satisfactory results are obtained when the electrolyte is present in a 1% solution.

Referring to the drawing, the reaction chamber 1, which preferably consists of a cylinder of pyrex glass having an internal diameter of 4.25" and provided with tubulatures positioned near the top and bottom of the chamber, is fitted with a porous septum 3 upon which is placed a catalytic material 2. Positioned at the vertical axis of the chamber is a rare gas tube 4, e. g., neon, which is in operative electrical connection with a source 5 leading into and through a transformer and condenser 6. The ends of the reaction chamber are closed by rubber caps 8, and there is also positioned therein a vent tube 7. In order to supply the conductive liquid there is provided a reservoir 24 containing, for example, a 1% aqueous solution of magnesium sulfate 25 which, by means of the conduit 22 and control valve 23, is permitted to flow into the base of the reacting chamber under a constant pressure established by a constant level of the solution in the reservoir. The hydrocarbon or admixture thereof, for example, a gasoline, is supplied to the reaction chamber through the upper tubulature 26 which is closed by a stopper 12 through which passes the conduit 11 connecting with the constant level supply main 9 carrying the hydrocarbon 10. The hydrocarbon flows into the upper part of the reaction chamber, passes down therethrough in contact with the catalytic agent under influence of radiations emanating from the neon tube and contacts with and rests upon the conductive liquid 25 at a position which is immediately opposite the outflow conduit 16.

The hydrocarbon and conductive liquid, therefore, form an interfacial contact in the presence of a catalyst and under influence of the tube radiations. The rate of flow of the hydrocarbon and electrolyte is so controlled that a constant level is maintained within the reaction chamber from which the hydrocarbon and conductive liquid flow out and into a collecting main. The outflow conduit 16 is connected with a valved pipe 18 controlled by the needle plunger 19, and this valve in turn leads into the collecting main 20 in which the hydrocarbon and conductive liquid separate by gravity. When the procedure is conducted for the obtention of butyl alcohol, it will be found that the upper or hydrocarbon layer contains the alcohol. This layer may then be separated from the aqueous conductive liquid in a suitable manner, as withdrawing one from the other, and the hydrocarbon then treated to separate the alcohol. Finally the alcohol may be purified by passing it through a rectification with utilization of a tower in association with dephlegmators.

A catalyst suitable for the production of butyl alcohol may be prepared by taking a porous insoluble material, as a granular active carbon, e. g., cocoanut charcoal, heating in an iron vessel as a bomb whereby it is freed from adhering organic matter, and then immersed in water. A copper hydroxide-copper carbonate precipitate is prepared by adding a 5% sodium hydroxide solution to a 5% solution of copper sulfate until the precipitate gives an alkaline reaction to phenolphthalein. The supernatant liquid at this period should remain acidic. Thereafter a 5% solution of sodium bicarbonate is added until the liquid becomes alkaline, and care should be taken to avoid an excess.

This precipitate is now filtered, as through a cotton cloth, and washed with water until it is substantially free from the sulfate ion. The physical characteristics of the precipitated basic copper carbonate may be improved by having a small amount of a sugar present in the copper sulfate solution. For this purpose one may use glucose, mannose, galactose, sucrose, maltose and the like. The basic copper carbonate in suspension is then admixed with the granular active charcoal in an amount such that upon subsequent reduction to metallic form there will be present from 0.05 to 1% metallic copper, as an impregnation. To the suspension containing the basic copper salt, and prior to admixture with the carbon, there is added a salt of cerium, as cerium oxalate in an amount to give in the finished catalyst from 0.5 to 1% of metallic cerium.

More particularly, the quantity of basic copper carbonate and of cerium oxalate represents about 0.1% of the carbon expressed as the metals, i. e., the amount of basic copper carbonate and of cerium oxalate should be sufficient to give 0.1% metallic copper and cerium in the finished catalyst. The admixture is effected with vigorous stirring in the form of a very fine suspension whereupon the carbon absorbs the suspended copper and cerium salts, then the mass is filtered, as through a cotton cloth, and the mass again placed in an iron bomb and heated to 675° C., whereby the carbon effects reduction of the salts with formation of the metals, copper and cerium. The catalyst thus obtained is now admixed with 0.1% fine aluminum oxide and 0.1% to 20 mesh aluminum oxide, and subjected to a final heating at a temperature of about 400° C. When the bombs have cooled sufficiently a straight run gasoline is added in small proportions until the carbon remains covered therewith.

The aluminum oxide used is preferably that which has been prepared by an anodic oxidation of aluminum granules suspended from the anodes of an electrolytic bath. The electrolyte is 35% sulfuric acid and the oxidation is brought about by utilizing a current of 12 amperes under an impress of 12 volts with the current passing for a period of about 1.5 hours. The granules are then removed, washed, freed from water and dried.

An analysis of the catalytic material for copper and cerium content shows that the method of preparation does not entail any loss of either of the metals inasmuch as the values found by suitable analytical procedure conform with the calculated amount based upon the quantities used. When it is desired to produce ethyl alcohol, the charcoal is preferably impregnated with nickel and vanadium in conjunction with aluminum oxide. The preparation may be effected by heating the carbon to 400° to free it from organic matter, and after cooling impregnating with the desired quantities of nickel hydroxide and vanadium pentoxide.

The nickel hydroxide may be prepared by treating a 5% solution of nickel sulfate with a solution of sodium hydroxide having an equal strength. Addition of the caustic is discontinued when the supernatant liquid no longer yields a precipitate of nickel hydroxide. The precipitate may be filtered through cloth and washed free from electrolyte with water. An amount of the nickel hydroxide sufficient to give a carbon containing 0.05 to 1% nickel may be added to water to form through agitation a thin but thorough suspension. The same weight of vanadium pentoxide, i. e., $V_2O_5$ is mixed into the suspension. A preferred quantity of the nickel and vanadium is about 0.1% of each of the metals based upon the weight of the carbon. The prepared suspension is poured upon the carbon which is covered with water to prevent local adsorption.

After stirring the mixture for a period of time, about 10 minutes, it is filtered through cloth. The mass so obtained is now heated to a temperature of 750 to 775° C., in order to effect reduction, especially of the nickel oxide to metallic form. The mass is then cooled whereupon powdered aluminum oxide and 30 mesh aluminum oxide may be added, in proportion about 0.1% of each based upon the weight of carbon. Finally the mass containing the aluminum oxide is heated to 400° C., and as it cools down a hydrocarbon or mixture thereof, as gasoline, is carefully added to prevent absorption of air. The catalyst then is ready for placement within the reaction chamber or tube for effecting the production of ethyl alcohol when subjected to the influence of radiations from a rare gas lamp.

Instead of an active charcoal such as above described the insoluble porous material which is impregnated may be broken pumice, broken "filtros", various porous ceramics, compacted diatomaceous earth, etc.

The rare gas tube found to be suitable is one having an overal length of about 60" and a diameter of 18 mm. After evacuating the tube and heating with a 200 milliampere current until the electrodes are cherry red twice, the tube is cooled slightly above body temperature whereupon the pump is cut out and 4.5 to 4.75 mm. of neon admitted. The tube is then sealed off and is in condition for placement for the conversion of hydrocarbons.

As above indicated the conductive material may consist of an aqueous solution of an electrolyte, especially a sulfate or a phosphate. The interfacial contact of the hydrocarbon with the conductive material is maintained at the lower tubulation of the reaction chamber. The conductive liquid contains a small amount, as for example, about 1% of electrolyte, such as magnesium sulfate, sodium sulfate, potassium sulfate, etc. The concentration of the electrolyte, however, may vary from 0.1 to 2% and the final quantity of water is added slowly so that the resistance of the solution will lie between 15 and 35 ohms. A 1% solution, which is preferred, has a resistance of about 30 ohms. Maintenance of the hydrocarbon aqueous electrolyte solution interface is effected by controlling the flow of the conductive liquid through a sight dropper and introducing it into the reaction chamber from the bottom. The hydrocarbon is maintained at a constant level by a free connection near its top with the constant level main which serves to convey the hydrocarbon to the reaction chamber. The hydrocarbon being of lighter specific gravity remains on top of the conductive material forming an interface which remains constant at the outlet or lower tubulation, and this constancy is maintained by controlling the total discharge of liquid at a rate greater than the amount of the conductive material entering the reactive chamber.

The construction at the outlet or lower tubulation accurately governs not only the total flow of liquid but also the position of the interface. It will be noted that the conduit is not a continuous conduit but rather it is interrupted. The inner portion consists of a short tube 13 which is fitted into the stopper or closure 15, and carries upon the inner end a perforate or foraminate structure, for example, a gauge. There is a space between the short tube 13 and the longer tube or conduit 16. This renders it possible to maintain an interface not only within the reaction chamber but into and through the outlet as well.

The production of butyl alcohol with the reaction chamber containing as the catalytic material granular active carbon impregnated with copper, cerium and aluminum oxide, may be effected by passing a hydrocarbon material, as gasoline, through the reaction chamber at a rate which may vary from 1.5 to 10 gals. per hour while under the influence of the neon lamp and in interfacial contact with an aqueous solution of magnesium sulfate. The tube is attached through a condenser to the secondary of a transformer which may be operating at a voltage of 1,000 to 5,000. The current flow through the tube may be from 4 milliamperes to about 30 milliamperes. While the hydrocarbon flow is as above indicated, that of the electrolyte is only about 1/20 thereof.

Following conversion of the hydrocarbon into butyl alcohol the hydrocarbon and aqueous layers are separated, and the hydrocarbon layer containing the alcohol treated with 77% sulfuric acid. The alcohol is taken up by the acid and separated from the oil layer. This acid-alcohol mixture may now be added to about 5 volumes of water, placed in a copper still and the alcohol obtained by rectification. It has been found that when a high boiling hydrocarbon, as a refined lubricating stock, is used as the raw material, a separation of the hydrocarbon and alcohol will take place directly without the intermediation of an acid treatment.

The production of ethyl alcohol is attended by the use of a nickel-vanadium-aluminum oxide catalyst with interfacial contact with a conductive liquid, as a 1% solution of magnesium sulfate and with rates of flow and neon tube operation like unto that described above in connection with the production of butyl alcohol. The other alcohols as propyl, amyl, etc., may be produced in like manner with suitable catalytic agent, conductive material, rates of flow and tube characteristics.

The following explanation is given with the thought of thereby presenting somewhat of a picture as to the mechanism whereby alcohols may be produced from hydrocarbons under the influence of rays from a rare gas lamp, or more generally in an electric field.

The simplest cracking of a paraffin may be represented as follows:

$$C_nH_{2n+2} \rightarrow C_xH_{2x+2} + C_yH_{2y}.$$

The last type ($C_yH_{2y}$) is the general formula for olefins. This class of compounds may be hydrated through the intermediate action of sulphuric acid to yield secondary but not primary alcohols. Since the alcohols formed in this case are primary, there is no reason for assuming that olefins enter into the reaction. In fact, their presence at any time would require a special explanation to account for the production of primary alcohols as the final products of reaction.

It seems more reasonable to assume that the electric field surrounding the high tension rare gas lamp makes possible the temporary existence of aliphatic ions (even though they could not correctly be called free radicals). Thus decane might be cleaved in this manner:

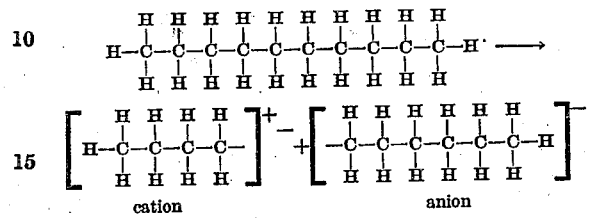

The portion carrying the positive charge (called cation for convenience) would associate with a hydroxyl group at the interface of the electrolyte to form an alcohol (in this case butyl). Then the negative segment would attach a proton from the water to form a paraffin (hexane). The segment containing the smaller number of carbon atoms would be expected to carry the positive charge and therefore be the one which yields the alcohol. Furthermore, on the basis of stability to heat, one would expect hydrocarbons containing fifteen or more carbon atoms to be most easily cleaved. An observation seems to verify this anticipation.

Since certain changes may be made in carrying out the above process; in the catalytic material, and in the above described apparatus construction which embody the invention without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. A process for the conversion of hydrocarbons into oxygenated derivatives which comprises passing a hydrocarbon through a zone containing radiations from an operating neon lamp in the presence of an oxidizing catalyst and in interfacial contact with an aqueous solution of a salt.

2. A process for the conversion of hydrocarbons into oxygenated derivatives which comprises passing a hydrocarbon through a zone containing radiations from an operating rare gas lamp in the presence of an oxidizing catalyst and in interfacial contact with an aqueous solution of a salt having a specific gravity greater than that of the hydrocarbon.

3. A process for the conversion of hydrocarbons into oxygenated derivatives which comprises passing a hydrocarbon through a zone containing radiations from an operating rare gas lamp in the presence of an oxidizing catalyst and in interfacial contact with an aqueous solution of an electrolyte.

4. A process for the conversion of hydrocarbons into oxygenated derivatives which comprises passing a hydrocarbon through a zone containing radiations from an operating rare gas lamp in the presence of an oxidizing catalyst and in interfacial contact with an aqueous solution of a sulfate.

5. A process for the conversion of hydrocarbons into oxygenated derivatives which comprises passing a hydrocarbon through a zone containing radiations from an operating rare gas lamp in the presence of an oxidizing catalyst and in interfacial contact with an aqueous solution of magnesium sulfate.

6. A process for the conversion of hydrocarbons into oxygenated derivatives which comprises passing a hydrocarbon through a zone containing radiations from an operating rare gas lamp in the presence of an oxidizing catalyst comprising a plurality of metals and in interfacial contact with an aqueous solution of a salt.

7. A process for the conversion of hydrocarbons into oxygenated derivatives which comprises passing a hydrocarbon through a zone containing radiations from an operating rare gas lamp in the presence of an oxidizing catalyst comprising a plurality of metals and aluminum oxide and in interfacial contact with an aqueous solution of a salt.

8. A process for the conversion of hydrocarbons into oxygenated derivatives which comprises passing a hydrocarbon through a zone containing radiations from an operating rare gas lamp in the presence of an oxidizing catalyst comprising a porous insoluble material impregnated with a plurality of metals and aluminum oxide and in interfacial contact with an aqueous solution of a salt.

9. A process for the conversion of hydrocarbons into oxygenated derivatives which comprises passing a hydrocarbon through a zone containing radiations from an operating rare gas lamp in the presence of an oxidizing catalyst comprising granular carbon impregnated with a plurality of metals and aluminum oxide and in interfacial contact with an aqueous solution of a salt.

10. A process for the conversion of hydrocarbons into oxygenated derivatives which comprises passing a hydrocarbon through a zone containing radiations from an operating neon lamp in the presence of an oxidizing catalyst and in interfacial contact with an aqueous solution containing about 1% magnesium sulfate.

11. A process for the conversion of hydrocarbons into oxygenated derivatives which comprises passing a hydrocarbon through a zone containing radiations from an operating rare gas lamp while in interfacial contact with an aqueous solution of a salt, and in the presence of an oxidizing catalyst.

WALDEMAR O. MITSCHERLING.